April 18, 1950
T. C. HARPER
2,504,684
EXTENSIBLE STRUCTURE FOR VARYING THE
CONFIGURATION OF AN AIRCRAFT SURFACE
Filed Jan. 30, 1946
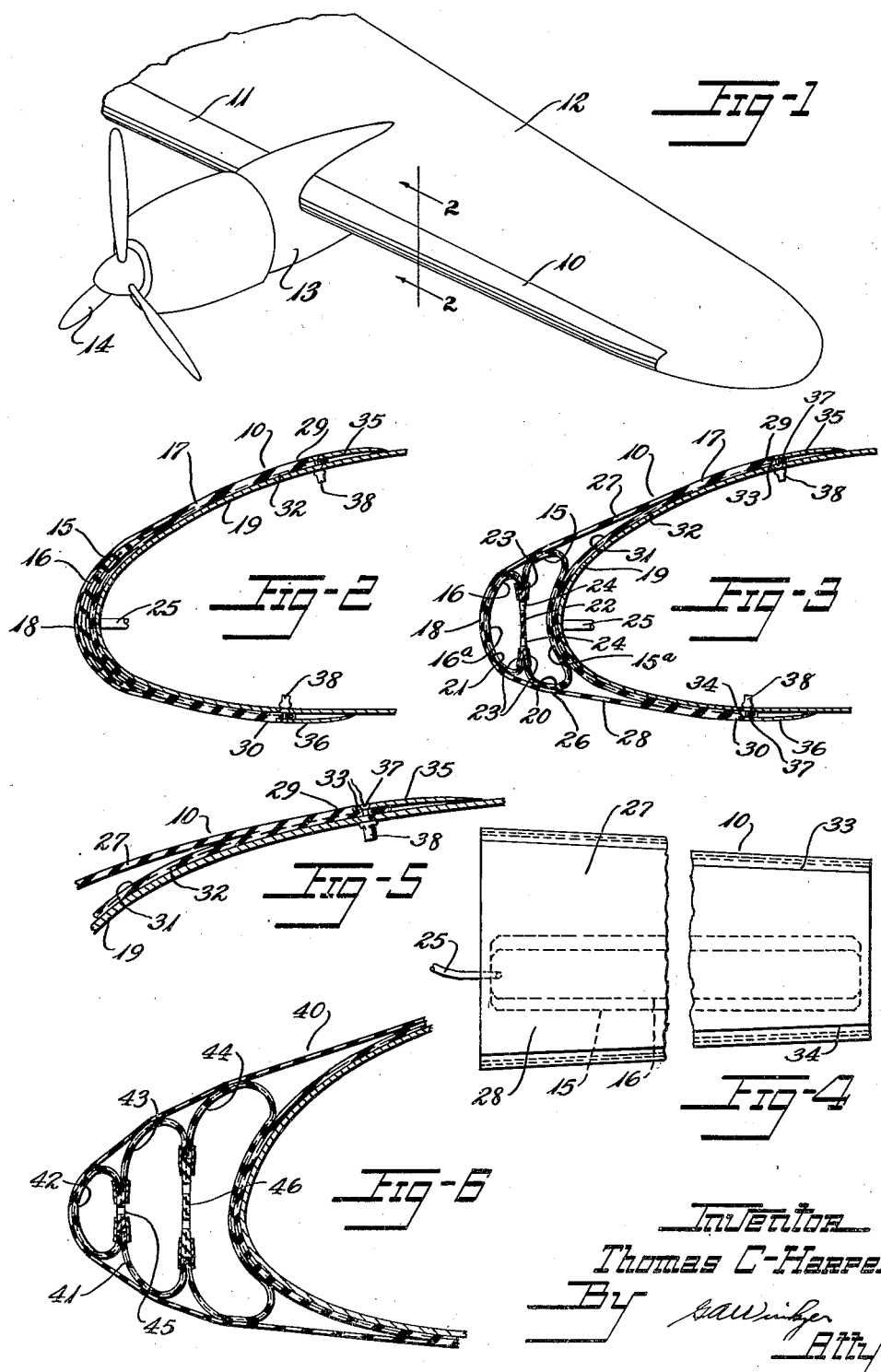
Inventor
Thomas C. Harper
By
Att Patented Apr. 18, 1950

2,504,684

UNITED STATES PATENT OFFICE 2,504,684

EXTENSIBLE STRUCTURE FOR VARYING THE CONFIGURATION OF AN AIRCRAFT SURFACE

Thomas C. Harper, Akron, Ohio, assignor to The B. F. Goodrich Company, New York, N. Y., a corporation of New York Application January 30, 1946, Serial No. 644,355

16 Claims. (Cl. 244—40)

1

The invention relates to extensible structures and especially to extensible inflatable structures for varying the configuration of a surface such, for example, as the leading edge of an airfoil.

Heretofore, inflatable shoes for removing ice at the leading edges of aircraft wings and other airfoils, which shoes may have had one or more inflatable tubes extending spanwise and centrally of the shoes generally in side-by-side relation, have been limited in their ability to provide the desired extent of forward movement of the forward walls of the shoes and to effect fully the desired changes in profile or configuration at such leading edges. The inflatable tubes have been limited as to size and as to extensibility, which in some cases has limited the ice-removal action and the desired configuration at the leading edges. Superimposed inflatable tubes independently operable, as heretofore proposed, have offered greater extension, but have presented the problems of controlling the extent of distention and the shape of the extensible structure as a result of the instability of the superimposed relation of the inflatable tubes.

An object of the invention is to overcome effectively the above-mentioned and other difficulties.

Other objects of the invention are to provide effectively for extending the structure in a direction and for restraining distention of said structure laterally of such direction; to provide for a considerable movement of extension; to provide for effectively restraining the side walls of the structure; to provide for stability of the structure, especially in the inflated condition, and for retractability of the structure from such inflated condition; to provide for a generally triangular form of the structure in section in the inflated condition; to provide for continuity of communication of the spaces within inflatable elements of the structure; to provide simplicity and compactness of construction; and to provide for convenience of manufacture and effectiveness of operation.

More specific objects of the invention are to provide for effective ice-removal at the leading edge of an airfoil; to provide for altering the configuration of the leading edge for ice-removal and other aerodynamic purposes while maintaining smooth aerodynamic flow of air across such leading edge; to provide for effecting changes in the radius of curvature of the leading edge; to provide for extensive forward movement of the forward wall of an inflatable shoe at the region of the immediate leading edge of the airfoil; to provide for controlling the extent of distention of the inflatable shoe while maintaining the desired stability; and to provide for effecting such forward movement of the shoe with minimum inflation requirements.

2

These and other objects and advantages of the invention will be apparent from the following description.

In the accompanying drawings which form a part of this specification and in which like numerals are employed to designate like parts throughout the same.

Fig. 1 is a front perspective view from above of extensible inflatable structures mounted at the leading edge of an aircraft wing and constructed in accordance with and embodying the invention, parts being broken away, Fig. 2 is a sectional view taken along line 2—2 of Fig. 1, parts being broken away, Fig. 3 is a sectional view like Fig. 2 but showing the structure in an inflated and extended condition.

Fig. 4 is a plan view from above of the structure before attachment to the wing, parts being broken away, Fig. 5 is a view on an enlarged scale of an upper rearward portion and attaching margin of the structure shown especially in Fig. 3, parts being broken away and in section, and Fig. 6 is a sectional view like Fig. 3 but showing a modified construction of the structure, parts being broken away.

In the illustrative embodiment of the invention shown in Figs. 1 to 5, the construction includes extensible inflatable structures or shoes 10, 11 comprising resilient rubber or other rubber-like material, which are mounted at the leading edge of an aircraft wing 12 and at the inboard and outboard sides, respectively, of an engine nacelle 13 having a propeller 14. Such shoes advantageously effect thorough and prompt removal of ice deposited at such leading edge, by virtue of their construction and arrangement providing for extensive forward movement of forward wall portions of the shoes in a stabilized and controllable manner together with extensive stretching of such wall portions, especially in the chordwise direction. The shoes also effect said ice-removal without causing objectionable deleterious turbulence of the ambient flow of air across the leading edge, thereby promoting stable or even improved flight conditions of the aircraft during the operation of the shoes, which advantageous functioning of the shoes is accomplished by virtue of the smooth aerodynamic configuration or profile of the shoes resulting from their inflation.

Since the inflatable structures or shoes are essentially alike, only the construction of the shoe 10 will be fully described. To the end of accomplishing the aforesaid and other advantageous results, the invention provides inflatable tubes or elements 15, 16 stacked or superimposed in the forward direction of the shoe and in united relation to one another and extending longitudinally of and beneath the outer surface of a covering 17 of resilient rubber or other rubber-like material. The inflatable tubes or elements may be positioned at the immediate leading edge region of the wing, as shown in the drawings. In the aforesaid stacked and united relationship, the inflatable tubes, which are in inflating communication with one another comprise an inflatable tubular structure of unitary construction and arrangement facilitating the provision of extensive stretching and forward movement of a resilient forward wall portion 18 of the covering 17 in a stable, controllable manner, while maintaining the desired aerodynamic characteristics of the wing 12.

The tubes 15, 16 are of different diameters for the form shown especially in Figs. 1 to 3, the rearward tube 15 of larger diameter being nearest the skin 19 of the wing 12, the inner rear wall portion 15a of the tube 15 being united with the covering, and the smaller forward tube 16 being superimposed on the tube 15 and beneath the outer surface of the forward wall portion 18 of the covering, the outer front wall portion 16a of the tube 16 being united with the forward wall portion 18. If desired, other arrangements and sizes of the stacked and united tubes may be used to effect the desired forward movement and changes in surface-configuration. For example, the smaller tube may be disposed beneath the larger tube, or the tubes may be of the same diameter. However, the arrangement illustrated has the advantage of providing a generally triangular form in section with the apex of the triangle forward in the line of flight.

For the particular arrangement shown, the relatively large diameter tube 15 is of such size that in width it extends in the chordwise direction across the leading edge throughout a substantial extent of the immediate leading edge region of the wing. The arrangement provides a relatively extensive inner rear wall portion 15a of the tube 15 adjacent and supported in backing relation by the wing-skin 19 facilitating advantageously the provision of a stable base of substantial supported area for the inflatable tubular structure under inflation of the tubes 15, 16 and despite the relatively sharp curvature of the leading edge underlying said large tube.

The tubes 15, 16 have walls of suitable resilient rubber material, each wall having a flexible reinforcement 20, 21 therein, which reinforcement may be of relatively extensible or inextensible woven or knitted textile fabric or other suitable flexible reinforcing material such, for example, as cords and fine wires. In the preferred construction, the reinforcement of the rubber wall is made of square-woven cotton, rayon or nylon fabric, straight-laid, for limiting stretching of said wall, such fabric being relatively inextensible as compared to an extensible material such, for example, as stockinette or other knitted or otherwise stretchable fabric of rayon or nylon, although cotton or other suitable material may be used.

The forward tube 16 including the reinforcement 21 is united at its rear wall with the forward wall of the rearward tube 15 including the reinforcement 20, as shown especially in Fig. 3, which rear and forward walls, respectively, may terminate at the region of their joinder facilitating the provision of a common or intermediate restraining wall portion 22 for the united tubes 15, 16. Although the wall portion 22 may, if desired, be relatively inextensible, preferably, it has relatively high stretching and recovery characteristics facilitating an accordion-like extension and recovery action of the inflatable tubular structure and to this end may be wholly of suitable elastic fabric material such, for example, as a woven textile fabric having straight warp threads with adjacent filling threads highly twisted in reverse directions, or wholly of resilient rubber material, or of said rubber material reinforced as by said elastic fabric. Such elastic fabric has extensive stretchability along the filling threads, disposed laterally of the inflatable tubular structure, and has little or no stretchability along the warp threads, disposed longitudinally of said structure. For such arrangement, lateral distention of the sidewalls of the structure is elastically restrained, while the return of the structure from its distended condition, as shown especially in Fig. 3, to its deflated condition, as shown especially in Fig. 2, is facilitated by virtue of the highly stretchable and elastic characteristics of such common wall portion 22 construction including said elastic fabric reinforcement. The arrangement also facilitates extensive forward movement of the front wall of the tube 16 relative to the rear wall of the tube 15 at the skin 19 of the wing while lateral stability of the structure is maintained.

The common wall portion 22 may be attached to the united walls of the tubes 15, 16 at their juncture as by a suitable adhesive such, for example, as rubber cement, or by sewing, or both, and as by strip reinforcements 23, 23 of suitable fabric material adhesively attached to said walls, as shown especially in Fig. 3. The common wall portion 22 is perforated or apertured as at 24, 24 for relatively unrestricted and fully free inflating communication of the tubes 15, 16 one to another. For inflating purposes, the rearward tube 15 may be connected at its rear wall portion 15a to a suitable conduit 25 and through said conduit to a source of air under pressure suitably located in the airplane structure.

The covering 19 comprises an outer layer 26 of suitable resilient rubber material including the forward wall portion 18 overlying the inflatable tubes 15, 16 and stretchable portions 27, 28 extending rearwardly from the tubes substantially to attaching margins 29, 30 of the covering. The covering also includes an inner layer 31 of suitable resilient rubber material underlying the inflatable tubes and having desirably a sheet reinforcement 32 of suitable relatively inextensible fabric material, the reinforced inner layer serving to transmit the major portion of the tensioning forces in the covering for the installed condition of the latter. The inner layer 31 is coextensive with the outer layer 26 throughout the extent of the covering. Both layers are united respectively with the front and rear wall portions 15a, 16a of the tubes and are united at the attaching margins; but are desirably in separated unattached relation to one another at the stretch areas extending rearwardly from the tubes to substantially the attaching margins 29, 30, as shown especially in Fig. 3, for facilitating extensive stretching of the forward wall portion 18 and stretchable portions 27, 28 of the outer layer 26 and facilitating effective ice-removal from the covering, especially at the respective portions 18, 27 and 28, by virtue of the change in configuration of the covering and said extensive stretching of the latter portions.

The fabric and rubber parts of the covering are united preferably as by vulcanization under heat and pressure except as described hereinabove relative to the stretch areas having separated inner and outer layers. The attaching margins 29, 30 may be recessed at 33, 34 for receiving fairing strips 35, 36 of lightweight sheet metal such, for example, as sheet aluminum for facilitating smooth flow of air thereover, the margins and fairing strips being attached to the wing structure as by screw fasteners 37, 37 extending through them and engaging suitable hollow threaded rivet fasteners 38, 38 secured to the skin 19 of the wing. The covering may be mounted in a tensioned condition between the attaching margins.

In the operation of the covering 10, the inflatable tubes 15, 16 being in free communication with one another through the perforated wall portion 22 are distended substantially simultaneously with the admission of air under pressure through the conduit 25, the tubes tending to assume the form shown especially in Fig. 3, which may be generally triangular in cross-section with rounded apex. Upon such inflation of the tubes, the front wall portion 16a of the tube 16 moves in the direction away from the opposite rear wall portion 15a of the tube 15, while the elastic wall portion 22 connecting opposite side-wall portions of the tubes intermediate the front and rear wall portions 15a, 16a, elastically restrains the distention of said sidewall portions laterally of said direction during the inflation of the inflatable tubular structure. The inflation of the tubes in the aforesaid controllable and stabilized manner by virtue of their hereinabove described construction and arrangement within the covering 10, especially with regard to the relatively extensive supported area of the wall portion 15a providing lateral stability, and the stretchable wall portion 22 resisting objectionable lateral distention of the sidewall portions of the tubes, causes coincidentally a radial change in configuration of the leading edge of the wing and extensive stretching and distention of the outer layer 26 of the covering.

The outer layer 26 at the forward wall portion 18 and the rearward stretchable portions 27, 28 is moved away from the inner layer 31 a substantial extent and the entire outer layer 26 is extensively stretched for breaking the adhesive bond of ice adhered thereon facilitating prompt and thorough removal of the ice by the flow of air. The change in configuration effected by the inflation of the tubes results in a distended form of the covering having a smoothly rounded streamline or aerodynamic shape in cross-section free of objectionable localized bulges thereby maintaining at all times the desired aerodynamic characteristics of the wing promoting safety of flight of the aircraft. The extensive stretching and change in configuration of the covering not only breaks the adhesive bond of the ice but in addition breaks the ice into pieces and shifts the broken pieces laterally into the laminar flow of air across the leading edge facilitating the effective removal of the ice deposited on the covering.

During the deflation phase of the cycle of operation, the resiliency of the outer layer 26 acts to return the covering to the uninflated condition shown especially in Fig. 2, and the elastic recovery action of the intermediate wall portion 22 functions in promoting the return of the inflatable tubular structure including the sidewall portions to its relatively compact accordion-like folded condition within the covering as shown also in Fig. 2. The continuity of aerodynamic contour of the covering is thus maintained throughout the deflation cycle as well as the inflation cycle phases of operation of the covering.

A further advantage of the construction of the covering is that the entire frontal area of the covering subjected to direct impact forces of the airflow across the leading edge is substantially fully supported throughout said area by the walls of the tubes in backing relation thereto thereby resisting objectionable distortion and bulging of the outer layer 26 as by flattening at the immediate frontal zone at the portion 18, and thus further promoting maintenance of the desired aerodynamic characteristics of the wing even at high speeds of flight.

The covering 10 constructed and arranged as described hereinabove may be so designed, proportioned, and mounted on the wing or other airfoil in a manner to effect an increase in the length of the chord of the wing without change in the radius of the leading edge of the wing or other airfoil, or to effect an increase in the radius of said leading edge especially for increasing the lift of the original airfoil; or to effect a decrease in the radius of said leading edge, especially for decreasing the drag of the original airfoil. It may also be used advantageously to effect a change in the camber of the wing for increasing airfoil-lift, and to effect an increase in the effective wing area of thin airfoils by lengthening the chord length of the latter.

A further advantage of the invention is that it may function to alter the aerodynamic characteristics of the wing at the will of the operator. For example, the covering 10 in the deflated condition fits snugly against the leading edge of a cambered wing, for example, with little or no effect on its "high-lift" characteristics as in take-off from the ground. After take-off, the inflation of the covering may by the outward elongation and reduction in radius of the leading edge (i. e., change in shape and sharper curvature of the leading edge) alter the wing profile to one known as the laminar flow type thus permitting the attainment of higher airplane speed for the same power output by virtue of the laminar flow principle of airfoils resulting in decreasing the drag of the wing or airfoil. Such functioning facilitates obtaining the benefits of high-lift characteristics and of high-speed (laminar flow) characteristics in one and the same basic wing or airfoil structure by simple, non-mechanical, inflatable covering means installed at the leading edge. The degree of laminar flow or extent of change from the original airfoil contour in cross-section, especially with respect to the sharpness of curvature at the leading edge, may also be altered effectively by varying the amount of inflation pressure, that is, a lower pressure resulting in less outward extension and less sharpness of curvature as compared to that resulting from a higher pressure.

The features of construction of the inflatable tubular structure comprising stacked and united inflatable tubes having a common apertured wall portion may be used in other applications than the leading edges of airfoils, in which other applications extensive forward movement of the forward wall of the structure relative to the supporting base is desired as for closing a space against air leakage, for example, such as the space between the wall of a housing compartment for a landing wheel and the wheel itself, or other space between parts of the structure of the airplane or vehicle.

The modified construction 40 of the covering, shown especially in Fig. 6, is substantially like that of the covering 10 except that the inflatable tubular structure 41 includes three inflatable tubes 42, 43, 44 of graduated size in stacked and united relation and having two common apertured wall portions 45, 46 preferably of elastic construction like the wall portion 22 of the covering 10. The construction and arrangement of the covering 40 is advantageous for providing more extensive forward movement of the forward wall of the covering than is practical for the covering 10 arrangement, the provision of which more extensive forward movement is accomplished without an objectionably large increase in air capacity requirement while retaining the aforesaid advantages of the covering 10 construction.

Variations may be made without departing from the scope of the invention as it is defined in the following claims.

I claim:

1. Apparatus for changing the aerodynamic configuration of the leading edge of an airfoil, said apparatus comprising a covering for said leading edge including an inflatable body having opposite wall portions one of which is of elastic material and movable in the direction away from the other wall portion and forward of the leading edge upon inflation of said body, means interiorly of said body connecting sidewall portions of the body opposite one another intermediate the first said wall portions for restraining distention of said sidewall portions laterally of said direction during the inflation of said body, the space of said body at the two sides of the connecting means being in inflating communication, and means for inflating said body.

2. Apparatus for preventing the accumulation of ice on the leading edge of an airfoil, said apparatus comprising a covering for said leading edge including an inflatable element having a wall of elastic material movable in the direction forward of the leading edge upon inflation of said element, a second inflatable element superimposed upon the first said element and having a wall movable in said direction to a position in advance of the first said wall upon inflation of said second element, said second element being united at its rear wall with the said wall of the first said element, and means for inflating said elements together, said means including a passage at the united walls of said elements for inflating communication between said elements.

3. Apparatus for changing the aerodynamic configuration of the leading edge of an airfoil, said apparatus comprising a covering of elastic material for said leading edge and said covering having an inflatable tubular structure comprising at least two inflatable elements stacked in the forward direction of the covering and in united relation to one another beneath the outer surface of said covering for disposition intermediate said surface and said leading edge, said structure being constructed and arranged to provide under inflation a shape in cross-section of the structure such as to maintain a relatively smooth aerodynamic contour of the covering while effecting a change in the configuration of said covering, said inflatable elements having a perforated wall portion common to each said elements at the region of their union interconnecting and restraining distention of sidewall portions of said structure opposite one another and providing inflating communication of said elements with one another, and means for inflating said inflatable tubular structure.

4. Apparatus as defined in claim 3 in which said common wall portion comprises elastic material for elastically restraining distention of said sidewall portions of said structure under said inflation of the latter.

5. Apparatus as defined in claim 3 in which said shape of said structure in the inflated condition is generally triangular in cross-section with a generally rounded apex nearest said outer surface of the covering.

6. Apparatus for preventing the accumulation of ice on the leading edge of an airfoil, said apparatus comprising a covering of elastic material for said leading edge and said covering comprising a rear margin, a distensible portion of said material spaced from said margin, a stretchable portion of said material intermediate said distensible portion and said margin of said covering, and inflatable means at said distensible portion beneath the outer surface of said covering for distending the covering in a manner to move a forward wall portion of said distensible portion in the forward direction relative to said leading edge while stretching said stretchable portion in the chordwise direction of the covering to break the ice deposited at said portions and for distending the covering in a manner to maintain a relatively smooth aerodynamic configuration of the covering about said leading edge, said inflatable means comprising a plurality of inflatable elements stacked in said forward direction and in united relation to one another providing a common wall portion at a region of their union interconnecting opposite sidewall portions of said elements, and means including a passage at said common wall portion of said elements for inflating communication of said elements.

7. Apparatus as defined in claim 6 in which said common wall portion of said elements includes an elastic material for elastically restraining distention of said sidewall portions while permitting the forward movement of said forward wall portion of said distensible portion under the inflation of said elements.

8. Apparatus for preventing the accumulation of ice on the leading edge of an airfoil, said apparatus comprising a covering of resilient rubber-like material for said leading edge and having opposite attaching margins, said covering including inner and outer layers of said material united with one another at said margins and in unattached relation to one another at regions between said margins, said outer layer comprising a distensible portion including a forward wall portion positionable immediately at said leading edge and stretchable portions extending rearwardly away from said distensible portion to said margins, said covering including an inflatable tubular structure at said distensible portion and between said inner and outer layers, said structure comprising a pair of inflatable tubes stacked in the forward direction of the covering and in united relation to one another having opposite wall portions united respectively with said inner and outer layers and having a common perforated wall portion of elastic material at the region of union of said tubes intermediate said opposite wall portions, said perforated wall portion interconnecting and restraining distention of sidewall portions of said tubes opposite one another while providing for inflating communication between said tubes, said inflatable tubes being constructed and arranged to provide under inflation a generally triangular shape in cross-section with rounded apex of said inflatable structure for effecting forward movement of said forward wall portion of the outer layer relative to said inner layer and stretching said stretchable portions in the chordwise direction of the covering to remove ice deposited at said distensible and said stretchable portions and for distending the covering to a relatively smooth aerodynamic configuration during said inflation, and means for inflating said inflatable tubular structure.

9. Apparatus for preventing the accumulation of ice on the leading edge of an airfoil, said apparatus comprising a covering of resilient rubber-like material for said leading edge and having opposite attaching margins, said covering including inner and outer layers of said material united with one another at said margins and in unattached relation to one another at regions between said margins, said outer layer comprising a distensible portion including a forward wall portion positionable immediately at said leading edge and stretchable portions extending rearwardly away from said distensible portion to said margins, said covering including an inflatable tubular structure at said distensible portion and between said inner and outer layers, said structure comprising three inflatable tubes of graduated size stacked in the forward direction of the covering and in united relation to one another and having common perforated wall portions of elastic material at the regions of union of said tubes for inflating communication between said tubes, the outer tube being of lesser size than the other tubes and having a front wall portion united with said forward wall portion of the outer layer, the inner tube being of larger size than the other tubes and having a rear wall portion united with said inner layer of the covering, said inflatable tubular structure under inflation being generally triangular in cross-section with rounded apex for effecting forward movement of said forward wall portion relative to said inner layer and stretching said stretchable portions in the chordwise direction of the covering to remove ice deposited at said distensible and said stretchable portions and for distending the covering to a relatively smooth aerodynamic configuration of the covering during said inflation, and means for inflating said inflatable tubular structure.

10. In an aircraft structure, in combination with a surface thereof, an inflatable body having wall portions mounted in superimposed relation upon said surface, one of which wall portions being distensible in the direction away from the other of said wall portions and away from said surface upon inflation of said body, means interiorly of said body connecting sidewall portions of the body intermediate said wall portions thereof for restraining distention of said sidewall portions laterally of said direction during inflation of said body while maintaining the space of said body at both sides of the connecting means in inflating communication, and means for inflating said body.

11. Inflatable means for a surface of aircraft comprising an inflatable body having opposite wall portions one of which is movable in the direction away from the other wall portion upon inflation of said body, means interiorly of said body connecting sidewall portions of the body opposite one another intermediate the first said wall portions for restraining distention of said sidewall portions laterally of said direction during the inflation of said body while maintaining the space of said body at both sides of the connecting means in inflating communication, said body having attaching margins for attachment to the aircraft to maintain said body in the desired position upon said surface, and means for inflating said body.

12. In an aircraft structure, in combination with a surface thereof, an inflatable body having wall portions mounted in superimposed relation upon said surface, one of which wall portions being distensible in the direction away from the other of said wall portions and away from said surface upon inflation of said body, a flexible element interiorly of said body connecting sidewall portions of the body intermediate said wall portions thereof for restraining distention of said sidewall portions laterally of said direction during the inflation of said body, the space of said body at the two sides of the connecting element being in inflating communication, and means for inflating said body.

13. An aircraft structure as defined in claim 12 in which said connecting element comprises elastic material for yieldably restraining distention of said sidewall portions laterally of said direction.

14. In an aircraft structure, in combination with a surface thereof, an inflatable tubular element mounted on said surface and having a wall movable in the direction away from said surface upon inflation of the tubular element, a second inflatable tubular element in stacked relation to the first said tubular element in said direction and united with said wall of the first said tubular element providing a common wall portion at the union, said second tubular element having a wall movable in said direction away from said surface upon inflation, and means for inflating said tubular elements together, said means including a passage in said common wall portion for inflating communication between said elements.

15. An inflatable structure for changing the configuration of a surface of aircraft, said structure comprising a sheet backing for attachment to said surface, an inflatable tubular element united with said backing and having a wall movable in the direction away from said backing upon inflation, a second inflatable tubular element superimposed upon the first said tubular element and having two walls one distensible in said direction upon inflation and a rear second wall in engagement with said movable wall of the first said tubular element, said second tubular element being united at said rear wall with said movable wall of the first said tubular element, and means for inflating said tubular elements together, said means including a passage through the united walls of said tubular elements for inflating communication between said tubular elements.

16. An inflatable structure as defined in claim 15 in which said united walls of said tubular elements comprise elastic sheet material for yieldably restraining distention of said tubular elements laterally of said direction.

THOMAS C. HARPER.

REFERENCES CITED

The following references are of record in the file of this patent:

UNITED STATES PATENTS

| Number | Name | Date |
|---|---|---|
| 1,475,210 | Upson | Nov. 27, 1923 |